(12) United States Patent
Branecky

(10) Patent No.: US 6,433,504 B1
(45) Date of Patent: Aug. 13, 2002

(54) METHOD AND APPARATUS OF IMPROVING THE EFFICIENCY OF AN INDUCTION MOTOR

(75) Inventor: Brian T. Branecky, Oconomowoc, WI (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 09/713,343

(22) Filed: Nov. 14, 2000

Related U.S. Application Data
(60) Provisional application No. 60/170,338, filed on Dec. 13, 1999.

(51) Int. Cl.[7] .................................................. H02B 5/34
(52) U.S. Cl. ........................ 318/727; 318/729; 318/801
(58) Field of Search ............................... 318/727, 729, 318/805, 798, 808, 801

(56) References Cited

U.S. PATENT DOCUMENTS

| | | | |
|---|---|---|---|
| 4,326,157 A | 4/1982 | Herbert | 318/809 |
| 4,400,655 A | 8/1983 | Curtiss et al. | 318/729 |
| 4,482,852 A | 11/1984 | Muskovac | 318/729 |
| 4,967,135 A | * 10/1990 | Ashikaga et al. | 318/808 |
| 5,159,255 A | 10/1992 | Weber | 318/775 |
| 5,321,599 A | 6/1994 | Tanamachi et al. | 363/41 |
| 5,334,923 A | * 8/1994 | Lorenz et al. | 318/805 |
| 5,479,081 A | * 12/1995 | Seibel et al. | 318/432 |
| 5,500,581 A | 3/1996 | Hatanaka et al. | 318/727 |
| 5,521,482 A | 5/1996 | Lang et al. | 318/800 |
| 5,731,682 A | 3/1998 | Yamakawa | 318/805 |
| 5,754,026 A | 5/1998 | Hampo et al. | 318/802 |
| 5,796,237 A | 8/1998 | Yamakawa | |
| 5,821,727 A | 10/1998 | Yura | |
| 5,828,199 A | * 10/1998 | Tajima et al. | 318/779 |
| 5,841,262 A | * 11/1998 | Tang | 318/696 |
| 5,861,728 A | * 1/1999 | Tazawa | 318/778 |
| 5,969,498 A | * 10/1999 | Cooke | 318/799 |

FOREIGN PATENT DOCUMENTS

| | | |
|---|---|---|
| EP | 0 615 336 A1 | 9/1994 |
| JP | 63-144795 | 6/1988 |

* cited by examiner

*Primary Examiner*—Robert E. Nappi
*Assistant Examiner*—Rita Leykin
(74) *Attorney, Agent, or Firm*—Michael Best & Friedrich LLP

(57) ABSTRACT

An apparatus and method of maximizing the efficiency of an induction motor is claimed. Three phase AC power is supplied to energize the motor. A DC voltage and a DC current are measured and used to determine an estimated phase voltage. An actual torque producing current is determined based on the DC voltage, DC current and the estimated phase voltage. An estimating torque producing current value is determined and compared with the actual torque producing current value. An error term representing the difference between the actual and estimated torque producing current values is determined. The estimated phase voltage value is changed based on the error term. The three phase AC power supplied to the motor is adjusted based on the estimated phase voltage.

51 Claims, 2 Drawing Sheets

METHOD AND APPARATUS OF IMPROVING THE EFFICIENCY OF AN INDUCTION MOTOR

RELATED APPLICATIONS

This application claims the benefit under 35 U.S.C. §119 of U.S. Provisional Application No. 60/170,338, entitled METHOD AND APPARATUS OF ESTIMATING ROTOR SPEED, filed on Dec. 13, 1999.

BACKGROUND

This invention relates to induction motors. More particularly, the invention relates to a method and apparatus to maximize the efficiency of an induction motor.

As an AC induction motor rotates, the magnetic fields of the rotor and the stator interact. The stator windings are typically connected to a supply in three-phase form or single phase form. By applying a voltage across the windings, a radial, rotating magnetic field is formed. The rotor has solid aluminum bars cast in a "squirrel-cage" configuration. The rotating magnetic fields produced by the stator produce a current in the aluminum bars of the rotor. This produces a magnetic field in the aluminum bars which interacts with the rotating magnetic field of the stator to generate torque on the rotor. The rotor reacts to the magnetic field, but does not travel at the same speed. The rotor actually lags behind the speed of the rotating magnetic field. This lag is called slip, and is essentially a comparison of the speed of the rotor and the speed of the magnetic field. The slip typically increases proportionately with increases in load.

Induction motors run less efficiently when lightly loaded. In order to increase efficiency of the motor, the flux of the motor may be reduced by utilizing the flexibility built into most variable speed drives. However, determining the ideal flux for maximum efficiency often requires the use of expensive sensors.

A common approach used to increase the efficiency of the induction motor is to sense the difference between the respective phases of the energizing voltage and current at the motor terminals. This requires identifying the zero crossings of the voltage and current waveforms. However, when the motor voltage is pulse-width modulated at a low frequency, phase detection is difficult because the current has some of the same components as the waveform of the carrier frequency. Thus, identifying the zero crossings of the phase current may be difficult.

Another approach used to increase the efficiency of an induction motor is to control the slip of the motor for maximum efficiency. To measure the slip, the actual rotor speed must either be measured or estimated. However, measuring or estimating rotor speed is very expensive.

SUMMARY OF THE INVENTION

Accordingly, the apparatus and method of the invention provide an accurate estimate of the slip of the motor using only one phase current sensor combined with knowledge of the voltage and current at the motor. In the apparatus of the invention, the motor includes a monitoring circuit to monitor an analog DC bus voltage and an analog DC bus current. A circuit connected to the monitoring circuit estimates the predetermined slip of the motor. A compensating circuit connected to the circuit adjusts the voltage applied to the motor such that the motor operates at the predetermined slip.

In the method of the invention, three phase AC power is supplied to energize the motor. A DC bus voltage and a DC bus current are measured. An actual torque producing current value is calculated based on the DC bus voltage and the DC bus current along with an estimated phase voltage. The actual torque producing current value and the estimated torque producing current value are compared. If the actual and estimated torque producing current values are different, an error term is produced representing that difference. The estimated phase voltage value is then changed based upon the previous estimated phase voltage value and the error term. The three phase AC power supplied to the motor is adjusted based on the estimated phase voltage.

The principal advantage of the invention is to optimize the running efficiency of the motor by determining the motor slip.

Another advantage of the invention is to provide an accurate estimate of the slip of the motor using only one phase current sensor.

Other features and advantages of the invention will become apparent to those skilled in the art upon review of the following detailed description, claims and drawings.

Figure 1:
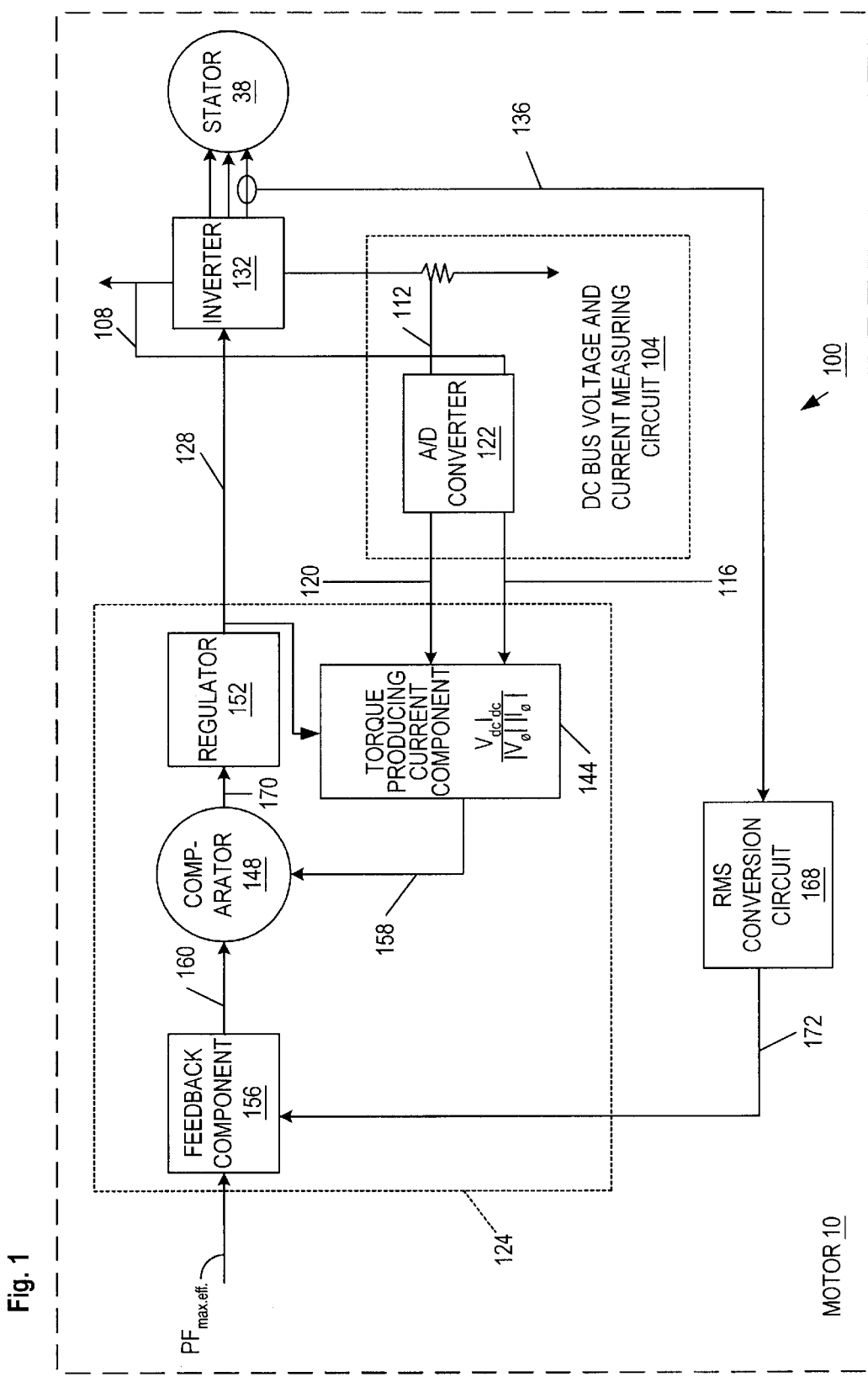
FIG. 1 is a schematic diagram of an induction motor including an efficiency optimization circuit for controlling the induction motor.

Before one embodiment of the invention is explained in detail, it is to be understood that the invention is not limited in its application to the details of the construction and the arrangement of the components set forth in the following description or illustrated in the drawings. The invention is capable of other embodiments and are carried out in various ways. Also, it is understood that the phraseology and terminology used herein is for purpose of description and should not be regarded as limiting.

DETAILED DESCRIPTION OF THE PREFERRED EMBODIMENTS

Shown in FIG. 1 of the drawings is a schematic view of an induction motor 10 embodying the invention. The details of the induction motor are commonly known in the art and form no part of the invention. Accordingly, the induction motor will not be described in detail. The motor 10 includes an efficiency optimization circuit 100 for controlling the excitation of the stator 38. The efficiency optimization circuit 100 includes a measuring circuit 104 for measuring a DC bus voltage 108 and DC bus current 112. The DC bus voltage and current are input to analog to digital (A/D) converter 122 which is electrically connected to a circuit 124. The circuit 124 may be a microprocessor or may be comprised of discrete components. In the embodiment of the invention including a microprocessor, the method of the invention is preferably implemented using a computer software program or programs stored in the memory for the microprocessor. The circuit 124 includes a torque producing current circuit component 144, a comparator circuit component 148, a regulator circuit component 152, and a feed back circuit component 156. The circuit 100 also includes an inverter 132, and an RMS conversion circuit 168 connected as shown.

In operation, the slip at which a motor operates with maximum efficiency ($S_{max.eff}$) is constant for a given induction motor. Thus, lowering the operating voltage $V_\phi$ until ($S_{max.eff}$) is attained is one way of operating the motor at maximum efficiency. When the motor is operating at any slip less than the rated slip, the efficiency optimization circuit 100 of the invention uses the relationship between the torque producing component $I_q$ and flux producing component $I_d$ of the current $I_\phi$ supplied to the motor.

The measuring circuit 104 measures a DC bus voltage 108 and a DC bus current 112. These voltages are preferably measured via a voltage and current bus. The DC bus voltage 108 and the DC bus current 112 are analog signals that are converted by an analog-to-digital (A/D) converter 122 to a digital voltage signal 116 ($V_{dc}$) and a digital current signal 120 ($I_{dc}$).

The digital voltage signal 116 and the digital current signal 120 are supplied to the torque producing current circuit 144 along with an initial condition value of the phase voltage 128 ($V_\phi$). Assuming that the inverter 132 has no losses, the conservation of power equation in the inverter is:

$$P_{in} = V_{dc} \cdot I_{dc} = |V\phi| \cdot |I\phi| \cdot \cos(\theta) = P_{out};$$

where $\theta$ is the angle between the phase voltage $V_\phi$ the phase current $I_\phi$. Solving for the power factor yields:

$$\cos(\theta) = \frac{V_{dc} I_{dc}}{|V\phi| \cdot |I\phi|}.$$

Assuming that $\theta$ and $\phi$ (the angle between the phase current and the torque producing current) are approximately equal, then the torque producing component of the current $I_q$ is approximately defined by the following equation:

$$I\phi \cos(\theta) = \frac{V_{dc} I_{dc}}{|V\phi|}.$$

The torque producing current circuit 144 calculates the approximation of the torque producing component of the current 158 ($I_q$) as $I_\phi \cos\theta$, and inputs the current 158 to a comparator circuit 148. The comparator circuit 148 compares the current 158 with a desired torque producing current value 160. The desired torque producing current value ($I_\phi \cos\theta_{cmd}$) 160 is determined by the feedback circuit 156. The phase current 136 ($I_\phi$) is measured using a sensor (not shown) at the motor coils. The phase current 136 ($I_\phi$) is input into the RMS circuit 168, where the AC phase current 136 ($I_\phi$) is converted to an RMS value 172 ($I_{\phi RMS}$) of phase current 136 ($I_\phi$). The RMS value 172 is input into the feedback circuit 156, along with the power factor for maximum efficiency $\cos\theta_{cmd}$, which is a known constant for the motor. The feedback circuit 156 determines the appropriate angle, based on motor parameters, between the phase voltage $V_\phi$ and the phase current $I_\phi$ for maximum efficiency. More specifically, the feedback circuit 156 calculates the cosine of the angle, thus factoring the change of angle from $I_\phi$ to $I_q$, resulting in the estimated torque producing current value $I_\phi \cos\theta_{cmd}$ 160.

Comparator circuit 148 compares the desired torque producing current value 160 ($I_\phi \cos\theta_{cmd}$) and the current 158 to generate an error term 170 representing the difference between the calculated and desired torque producing current. The error term 170 is supplied to the regulator circuit 152. If the calculated and desired torque producing current values are the same value, the error term 170 is zero.

The regulator 152 increments or decrements the commanded phase voltage 128 ($V_\phi$) by the error term 170, generating a new value for a commanded phase voltage value 128. If the calculated and desired torque producing current values are the same, the error term 170 is equal to zero, and accordingly, the commanded phase voltage does not change. The new commanded phase voltage is then input into the inverter 132, which converts the rectified DC power to three-phase AC power. The three-phase AC power is then fed to the terminals 38 of motor 10.

The new commanded phase voltage 128 ($V_\phi$) is also fed back from the regulator 152 and used as the next commanded phase voltage ($V_\phi$) for determining the actual torque producing current, and the cycle repeats. By constantly updating the commanded phase voltage $V_\phi$, the motor 10 is able to continually operate at the slip, thereby increasing the efficiency of the motor.

Figure 2:
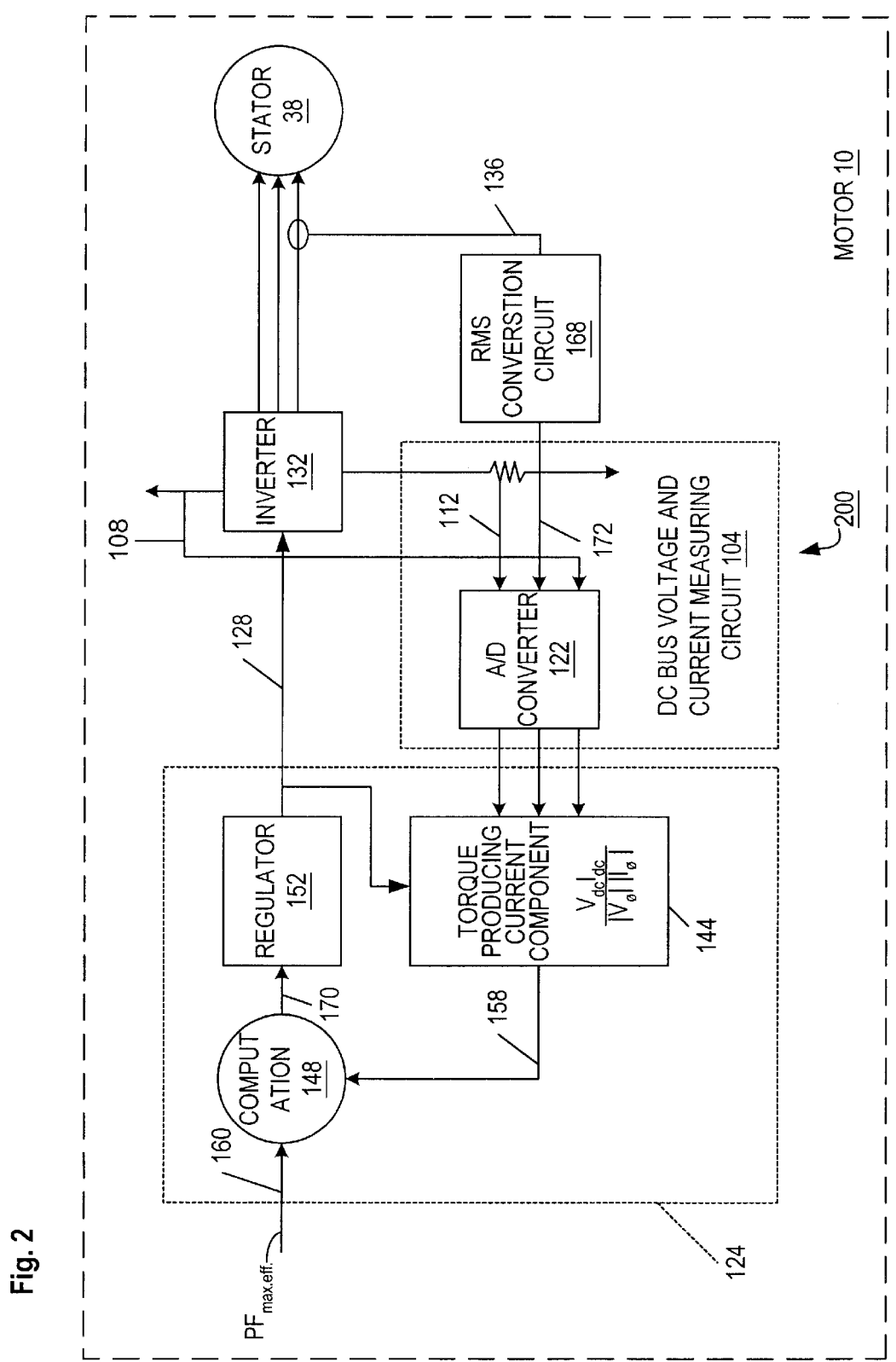
FIG. 2 is a schematic view of another embodiment of the efficiency optimization circuit of the induction motor.

FIG. 2 schematically illustrates another embodiment 200 of the efficiency optimization circuit of the induction motor. Like parts are identified using like reference numerals. As shown in FIG. 2, the input 160 to computation circuit 148 is simply the desired power factor $\cos\theta_{cmd}$, and the input 158 to computation circuit 148 from the torque producing current circuit 144 is a calculated power factor ($\cos\theta$), which is calculated similar to $I_\phi \cos\theta$, except that the additional division operation is performed using $I_\phi$. This is achieved by directly supplying the RMS phase current 172 ($I_{\phi RMS}$) to the torque producing current circuit 144 through A/D converter 122, instead of through a feedback loop as is shown in FIG. 1. The overall operation of the efficiency optimization circuit 200 is simpler than that of the efficiency optimization circuit 100, and thus requires less time to update the commanded phase voltage ($V_\phi$).

Various features and advantages of the invention are set forth in the following claims.

What is claimed is:

1. A method of maximizing the efficiency of an induction motor, the method comprising the acts of:
    supplying three phase alternating-current (AC) power to the motor to energize the motor;
    measuring a direct-current (DC) bus voltage and a DC bus current;
    determining an estimated phase voltage;
    determining an actual torque producing current value based on the DC bus voltage, the DC bus current and the estimated phase voltage;
    determining an estimated torque producing current value;
    comparing the actual torque producing current value with the estimated torque producing current value;
    determining an error term representing the difference between the actual and estimated torque producing current values;
    changing the estimated phase voltage value based on the error term; and
    adjusting the three phase AC power supplied to the motor based on the estimated phase voltage.

2. The method of claim 1, wherein the DC bus voltage is an analog DC bus voltage, wherein the DC bus current is an analog DC bus current, and wherein the method further comprises the act of converting the analog DC bus voltage and the analog DC bus current to a digital DC voltage and a digital DC current, respectively.

3. The method of claim 1, further comprising the act of converting the estimated phase voltage to three phase AC power.

4. The method as set forth in claim 1, wherein the acts of determining an actual torque producing current value and determining the error term are accomplished using a microprocessor.

5. The method as set forth in claim 2, wherein the act of converting the analog DC bus voltage and the analog DC bus current to digital signals uses an analog to digital converter.

6. The method as set forth in claim 1, wherein the error term is calculated based on a difference between a desired power factor and a calculated power factor.

7. An induction motor comprising:
   a rotor;
   a stator;
   a monitoring circuit to monitor a direct-current (DC) bus voltage and a DC bus current;
   a circuit to estimate a one of the slip, power factor and torque producing current of the motor based on the DC bus voltage and the DC bus current; and
   a compensating circuit to change the flux in the motor based on the one of the estimated slip, power factor and torque producing current.

8. The motor of claim 7, wherein the estimating circuit is a microprocessor.

9. The motor of claim 7, wherein the estimating circuit includes a comparator circuit to compare the actual voltage being applied to the motor with an estimated voltage being applied to the motor.

10. The motor of claim 7, wherein the compensating circuit is a regulator.

11. The motor of claim 7, wherein the compensating circuit increments or decrements a voltage applied to the motor in response to the estimating circuit.

12. An efficiency optimization circuit comprising:
   a monitoring circuit to monitor a direct-current (DC) bus voltage and a DC bus current;
   a circuit to estimate a slip of the motor based on the DC bus voltage and the DC bus current; and
   a compensating circuit to adjust a voltage applied to the motor based on the estimated slip.

13. The efficiency optimization circuit of claim 12, wherein the estimating circuit is a microprocessor.

14. The efficiency optimization circuit of claim 12, wherein the estimating circuit includes a comparator circuit to compare the actual voltage being applied to the motor with an estimated voltage being applied to the motor.

15. The efficiency optimization circuit of claim 12, wherein the compensating circuit is a regulator.

16. The efficiency optimization circuit of claim 12, wherein the compensating circuit increments or decrements the voltage applied to the motor.

17. An efficiency optimization circuit for an induction motor, the circuit comprising:
   measuring means to measure an analog DC bus voltage and an analog DC bus current;
   converting means to convert the analog DC bus voltage and the analog DC bus current to a digital DC bus voltage and a digital DC bus current;
   estimating means to estimate a phase voltage;
   first calculating means to calculate an actual torque producing current value based on the digital DC bus voltage, the digital DC bus current and the estimated phase voltage;
   comparing means to compare the actual torque producing current value with the estimated torque producing current value;
   second calculating means to calculate an error term representing the difference between the actual and estimated torque producing current values; and
   adjusting means to change the estimated phase voltage value based on the error term.

18. A data processing system for determining the slip of an induction motor, the processing system comprising:
   a computer processor for processing data;
   a storage medium for storing data;
   a trigger signal for initializing the storage medium;
   a monitoring circuit to monitor a direct current (DC) bus voltage and a DC bus current;
   a circuit to estimate a slip of the motor based on the DC bus voltage and the DC bus current; and
   a compensating circuit to change the flux in the motor based on the estimated slip.

19. The data processing system of claim 18, wherein the estimating circuit is a microprocessor.

20. The data processing system of claim 18, wherein the circuit further includes a comparator circuit to compare the actual voltage being applied to the motor with an estimated voltage being applied to the motor.

21. The data processing system of claim 18, wherein the compensating circuit is a regulator.

22. The data processing system of claim 18, wherein the compensating circuit increments or decrements a voltage applied to the motor in response to the estimating circuit.

23. A computer program product for determining the slip of an induction motor, the computer program product comprising:
   a computer usable medium having computer reachable program code embodied therein for estimating the slip of the motor;
   computer readable program code for causing the computer to determine an estimated voltage needed to operate the motor at the predetermined slip;
   computer readable program code for causing the computer to compare the actual voltage applied to the motor with the estimated voltage needed to operate the motor at the predetermined slip; and
   computer readable program code for causing the computer to adjust the voltage applied to the motor to operate the motor at the predetermined slip.

24. A method of maximizing the efficiency of an induction motor, the method comprising the acts of:
   measuring a direct-current (DC) bus voltage, a DC bus current, and a phase current;
   determining an initial value of a phase voltage;
   determining a calculated power factor value based on the DC bus voltage, the bus current, the phase current and the initial value of the phase voltage;
   determining a desired power factor value;
   comparing the calculated power factor value with the desired power factor value;
   determining an error term representing the difference between the calculated and desired power factor values; and
   changing the phase voltage based on the error term.

25. The method of claim 24, further comprising the acts of:
   supplying three phase alternating-current (AC) power to the motor to energize the motor; and
   adjusting the three phase AC power supplied to the motor based on the estimated phase voltage.

26. The method of claim 24, further comprising the act of converting the phase voltage to three phase AC power.

27. The method of claim 24, wherein the acts of determining a calculated power factor and determining the error term are accomplished using a microprocessor.

28. The motor of claim 7, wherein the estimating circuit includes a comparator circuit to compare an estimated torque producing current and a desired torque producing current, and wherein the compensating circuit changes the flux in the motor based on a difference between the estimated torque producing current and the desired torque producing current.

29. The motor of claim 28, wherein the estimating circuit further includes a torque producing current circuit to determine the estimated torque producing current based on the DC bus voltage and the DC bus current.

30. The motor of claim 29, wherein the estimating circuit is a microprocessor.

31. The motor of claim 29, wherein the induction motor further comprises a current sensor to measure a phase current and a root-mean-square (RMS) conversion circuit to determine an RMS current based on the phase current, and wherein the estimating circuit further includes a feedback circuit to determine the desired torque producing current based on the RMS current and a desired power factor.

32. The motor of claim 31, wherein the estimating circuit is a microprocessor.

33. The motor of claim 7, wherein the estimating circuit includes a comparator circuit to compare an estimated power factor with a calculated power factor.

34. The motor of claim 33, wherein the estimating circuit further includes a torque producing current circuit to determine the estimated power factor based on the DC bus voltage and the DC bus current.

35. The motor of claim 34, wherein the induction motor further comprises a current sensor to measure a phase current and a root-mean-square (RMS) conversion circuit to determine an RMS current based on the phase current, and wherein the torque producing current circuit further determines the estimated power factor based on the RMS current.

36. An efficiency optimization circuit comprising:
   a monitoring circuit to monitor a direct-current (DC) bus voltage and a DC bus current;
   a circuit to estimate a torque producing current of the motor based on the DC bus voltage and the DC bus current; and
   a compensating circuit to adjust a voltage applied to the motor based on the estimated torque producing current.

37. The efficiency optimization circuit of claim 36, wherein the estimating circuit includes a comparator circuit to compare the estimated torque producing current and a desired torque producing current, and wherein the compensating circuit changes the flux in the motor based on a difference between the estimated torque producing current and the desired torque producing current.

38. The efficiency optimization circuit of claim 37, wherein the estimating circuit further includes a torque producing current circuit to determine the estimated torque producing current based on the DC bus voltage and the DC bus current.

39. The efficiency optimization circuit of claim 38, wherein the induction motor further comprises a current sensor to measure a phase current and a root-mean-square (RMS) conversion circuit to determine an RMS current based on the phase current, and wherein the estimating circuit further includes a feedback circuit to determine the desired torque producing current based on the RMS current and a desired power factor.

40. An efficiency optimization circuit comprising:
   a monitoring circuit to monitor a direct-current (DC) bus voltage and a DC bus current;
   a circuit to estimate a power factor of the motor based on the DC bus voltage and the DC bus current; and
   a compensating circuit to adjust a voltage applied to the motor based on the estimated power factor.

41. The efficiency optimization circuit of claim 40, wherein the estimating circuit includes a comparator circuit to compare the estimated power factor with a calculated power factor.

42. The efficiency optimization circuit of claim 41, wherein the estimating circuit further includes a torque producing current circuit to determine the estimated power factor based on the DC bus voltage and the DC bus current.

43. The efficiency optimization circuit of claim 42, wherein the induction motor further comprises a current sensor to measure a phase current and a root-mean-square (RMS) conversion circuit to determine an RMS current based on the phase current, and wherein the torque producing current circuit further determines the estimated power factor based on the RMS current.

44. A data processing system for determining the slip of an induction motor, the processing system comprising:
   a computer processor for processing data;
   a storage medium for storing data;
   a trigger signal for initializing the storage medium;
   a monitoring circuit to monitor a direct current (DC) bus voltage and a DC bus current;
   a circuit to estimate a torque producing current of the motor based on the DC bus voltage and the DC bus current; and
   a compensating circuit to change the flux in the motor based on the estimated torque producing current.

45. The data processing system of claim 44, wherein the estimating circuit includes a comparator circuit to compare the estimated torque producing current and a desired torque producing current, and wherein the compensating circuit changes the flux in the motor based on a difference between the estimated torque producing current and the desired torque producing current.

46. The data processing system of claim 45, wherein the estimating circuit further includes a torque producing current circuit to determine the estimated torque producing current based on the DC bus voltage and the DC bus current.

47. The data processing system of claim 46, wherein the induction motor further comprises a current sensor to measure a phase current and a root-mean-square (RMS) conversion circuit to determine an RMS current based on the phase current, and wherein the estimating circuit further includes a feedback circuit to determine the desired torque producing current based on the RMS current and a desired power factor.

48. A data processing system for determining the slip of an induction motor, the processing system comprising:
   a computer processor for processing data;
   a storage medium for storing data;
   a trigger signal for initializing the storage medium;
   a monitoring circuit to monitor a direct current (DC) bus voltage and a DC bus current;
   a circuit to estimate a power factor of the motor based on the DC bus voltage and the DC bus current; and
   a compensating circuit to change the flux in the motor based on the estimated power factor.

49. The data processing system of claim 48, wherein the estimating circuit includes a comparator circuit to compare the estimated power factor with a calculated power factor.

50. The data processing system of claim 49, wherein the estimating circuit further includes a torque producing current circuit to determine the estimated power factor based on the DC bus voltage and the DC bus current.

51. The data processing system of claim 50, wherein the induction motor further comprises a current sensor to measure a phase current and a root-mean-square (RMS) conversion circuit to determine an RMS current based on the phase current, and wherein the torque producing current circuit further determines the estimated power factor based on the RMS current.

* * * * *